United States Patent [19]

Tierney

[11] 4,000,140

[45] Dec. 28, 1976

[54] SHEET MATERIAL

[75] Inventor: Patrick Joseph Tierney, New Barnet, England

[73] Assignee: Permanite Limited, Waltham Abbey, England

[22] Filed: May 21, 1975

[21] Appl. No.: 579,596

[30] Foreign Application Priority Data

May 23, 1974 United Kingdom ............ 23150/74

[52] U.S. Cl. .................. 260/28.5 A; 260/28.5 AV; 260/28.5 B

[51] Int. Cl.² ........................................ C08L 95/00

[58] Field of Search ............... 260/28.5 A, 28.5 B, 260/28.5 AV, 889

[56] References Cited

UNITED STATES PATENTS

| | | | |
|---|---|---|---|
| 3,356,764 | 12/1967 | Gentile | 260/889 |
| 3,414,533 | 12/1968 | Trieschmann et al. | 260/28.5 AS |
| 3,443,619 | 5/1969 | Kindle | 260/889 X |
| 3,646,168 | 2/1972 | Barrett | 260/889 |
| 3,790,519 | 2/1974 | Wahlborg | 260/28.5 A X |

*Primary Examiner*—Lewis T. Jacobs
*Attorney, Agent, or Firm*—Woodhams, Blanchard and Flynn

[57] ABSTRACT

The invention relates to a waterproof sheet material, suitable for use as a waterproof roofing layer, as a bridge deck or like waterproofing material, and as a dampcourse material, the sheet being composed of a mixture comprising (a) a bituminous material, (b) a synthetic polymeric material, and (c) particulate filler, said synthetic polymeric material comprising at least one uncured copolymer selected from ethylene-propylene copolymers and ethylene-propylene-diene copolymers and at least one synthetic polar elastomer. The sheet material may contain ethylene-vinyl acetate copolymer, and plasticizer, fire-retardant, and minor additives such as antioxidants may be incorporated. A suitable synthetic polar elastomer is nitrile rubber. The sheet material maintains good performance properties under low temperature conditions.

9 Claims, No Drawings

SHEET MATERIAL

This invention relates to a self-supporting waterproof bituminous sheet material and provides such a sheet material composed of a mixture comprising (a) a bituminous material, (b) a synthetic polymeric component comprising at least one uncured ethylene-propylene copolymer (EP) or ethylene-propylene-diene copolymer (EPDM) and at least one synthetic polar elastomer, and (c) particulate filler. The mixture preferably also contains fibres; at least one plasticiser is also preferably present. The synthetic polymeric component may contain other polymers, e.g. ethylene-vinyl acetate copolymer (EVA), and fireproofing additives may be incorporated in the mixture.

The sheet material can be formed from the ingredients of the mixture by internal mixing, milling and calendering, the latter step preferably leaving the finished sheet with a roughened surface. The sheet material can be employed as a waterproof membrane in building operations, e.g. in roofing or as a damp course material.

The bituminous material may be pitch and/or bitumen, preferably the latter, and preferably has a Ring and Ball softening point of 70° C or above. It will usually constitute from 5 to 30 wt. % of the mixture.

EPDM is preferred to EP for use in the invention, and the diene component of the terpolymer may for example be selected from dicyclopentadiene, 2-ethylidene norbornene, and 1,4-hexadiene. The synthetic polar elastomeric component, which will usually be employed in a proportion smaller than that of the EP or EPDM, may be selected, for example, from nitrile rubbers (butadiene-acrylonitrile polymers), polychloroprene, and styrene-butadiene rubbers (SBR); nitrile rubbers are currently preferred. The total synthetic polymeric component content of the mixture will usually be 50 wt. % or less, e.g. from 15 to 50 wt. % (this, of course, excluding any polymer which may be present as fibrous or particulate filler).

Particulate fillers which may be employed include carbon black, silica, silicates, polyester resin, and calcium carbonate. The filler content of the mixture will usually be from 5 to 60 wt. %, and is preferably made up of carbon black together with a white filler.

The fibres, which can act as a reinforcement for the sheet material, are preferably of synthetic thermoplastic material, nylon and polyester (e.g. polyethylene terephthalate) fibres being particularly suitable; polyacrylic, cellulose acetate, polypropylene, rayon and polyvinyl chloride fibres are also suitable. Inorganic (e.g. glass), mineral, animal or vegetable fibres can be incorporated in the mixture instead of or in addition to synthetic thermoplastic fibres, but the latter are much preferred. The total fibrous content of the mixture, when fibres are present, will preferably be up to 15 wt. %.

Further materials may be included, e.g. as extenders, and pigments may be used to give coloured products.

It is of advantage to employ EVA as part of the synthetic polymeric component, the EVA preferably containing from 15 to 35 wt. % of vinyl acetate, most preferably at least 18 wt. %, e.g. about 25 wt. %.

Plasticiser, when employed, will usually constitute up to 20 wt. % of the mixture. Suitable plasticisers include paraffinic and naphthenic processing oils and epoxidised soya bean oil.

Fire resistance, or self-extinguishing characteristics, can be imparted to the sheet product by incorporating in the mixture fire-retardants such as antimony compounds (e.g. the oxide or sulphide) and/or heavily chlorinated organic compounds, e.g. 50 or 70% chlorinated paraffins, the amount added being according to the degree of fire resistance required. For example, the antimony and chloro-compound additives may each be employed in proportions of up to 20 wt. % based on the synthetic polymeric component.

The preferred EP and EPDM copolymers employed according to the invention contain about 40 or 80 wt. % of ethylene, the EPDM preferably containing about 3 to 6, e.g. 5 wt. % of the diene.

The proportions of the various ingredients employed according to the invention are chosen to produce on blending a substantially continuous matrix of the bituminous material and synthetic polymeric component within which particulate and fibrous components, e.g. filler, etc., are substantially uniformly dispersed, the resulting uniform mixture being calenderable into a self-supporting sheet. Sheet material according to the invention shows excellent and lasting adhesion when bonded to roofing substrates with conventional (e.g. bituminous) adhesives.

The sheet material according to the invention is useful as a waterproofing layer in or on roofs (e.g. as an intermediate or exposed outer layer), as a dampcourse material, as a waterproofing layer in bridge decks and elevated motorway sections, and in similar waterproofing applications. It has, compared to known waterproofing sheet materials, particularly good durability and performance in structures subject to low temperatures, i.e. in areas having a generally cold climate or liable to hard winters.

EXAMPLE 1

The following ingredients were mixed in conventional manner and calendered to form a self-supporting roughened sheet:

| Ingredient | Parts |
| --- | --- |
| H110-120 bitumen | 12 |
| ethylene-propylene-1,4-hexadiene terpolymer ("Nordel" 1560) | 20 |
| nitrile rubber ("Epsyn" 55 – 35 wt. % acrylonitrile content, Mooney viscosity 80) | 9 |
| EVA (2805) | 6 |
| carbon black (HAF) | 20 |
| white filler (hydrated calcium silicate) | 20 |
| synthetic fibre (nylon or polyester) | 4 |
| plasticiser - paraffinic processing oil | 6 |
| - epoxidised soya bean oil | 3 |
| | 100 |

In addition small aounts of zinc oxide and stearic acid may be employed in the mix. To obtain a fire-resistant sheet, 7 parts each of antimony oxide and 70% chlorinated paraffin may be included with the above ingredients.

EXAMPLE 2

A sheet is made as in Example 1 from the following ingredients:

| Ingredient | Parts |
|---|---|
| H110-120 bitumen | 12 |
| ethylene-propylene-2-ethylidene norbornene terpolymer ("Vistalon" 3708, Esso Chemicals) | 20 |
| nitrile rubber (as in Example 1) | 8 |
| EVA (2805) | 6 |
| carbon black (N550) | 25 |
| white filler - zinc oxide | 3 |
| - precipitated calcium carbonate | 31 |
| nylon fibre | 4.7 |
| plasticiser - paraffinic processing oil | 11 |
| - epoxidised soya bean oil | 4 |
| antioxidant | 0.3 |

Antimony oxide and chlorinated paraffin may be incorporated in the mix to give fire resistance.

In the production of the sheet according to the invention a portion, e.g. up to 25 wt. %, of the synthetic polar elastomer may be replaced by chlorosulphonated polyethylene. Thus about 2 parts by weight of the nitrile rubber in Example 1 or Example 2 can be replaced by "Hypalon."

I claim:

1. A self-supporting waterproof bituminous sheet material consisting essentially of from 5 to 30 weight percent of bituminous mateial, from 15 to 50 weight percent of synthetic polymer material, from 5 to 60 weight percent of particulate filler, up to 15 weight percent of fibrous filler, up to 20 weight percent plasticizer and up to 20 weight percent of fire retardant, said synthetic polymer material consisting essentially of at least one synthetic polar elastomer and an uncured copolymer component selected from the group consisting of ethylene-propylene copolymers and ethylene-propylene-diene copolymers, and in which the synthetic polar elastomer is present in a proportion smaller than that of said uncured copolymer.

2. A sheet material according to claim 1 wherein said bituminous material has a Ring and Ball softening point of at least 70° C.

3. A sheet material according to claim 1 wherein said synthetic polymer material includes ethylene-vinyl acetate copolymer.

4. A sheet material according to claim 1 containing uncured ethylene-propylene-diene copolymer in which said diene component is selected from the group consisting of dicyclopentadiene, 2-ethylidene norbornene and 1,4-hexadiene.

5. A sheet material according to claim 1 wherein said synthetic polar elastomer is selected from the group consisting of nitrile rubbers, polychloroprene, and styrene-butadiene rubbers.

6. A sheet material according to claim 1 wherein said uncured copolymer contains 40 to 80 weight percent ethylene.

7. A sheet material according to claim 1 containing uncured ethylene-propylene-diene copolymer whose diene content is from 3 to 6 weight percent.

8. A sheet material according to claim 1 in which said synthetic polymer material consists essentially of ethylene-propylene-diene copolymer, butadiene-acrylonitrile copolymer rubber and ethylene-vinyl acetate copolymer, and said particulate filler consists of carbon black and at least one white filler.

9. A sheet material according to claim 1 containing chlorosulphonated polyethylene in an amount up to 25 weight percent of the synthetic polar elastomer.

* * * * *